US012549911B2

(12) United States Patent
Djalilian

(10) Patent No.: US 12,549,911 B2
(45) Date of Patent: Feb. 10, 2026

(54) DIRECT DRIVE HEARING AID STIMULATION METHODS

(71) Applicant: THE REGENTS OF THE UNIVERSITY OF CALIFORNIA, Oakland, CA (US)

(72) Inventor: Hamid Djalilian, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 341 days.

(21) Appl. No.: 18/021,833

(22) PCT Filed: Aug. 20, 2021

(86) PCT No.: PCT/US2021/046967
§ 371 (c)(1),
(2) Date: Feb. 17, 2023

(87) PCT Pub. No.: WO2022/040568
PCT Pub. Date: Feb. 24, 2022

(65) Prior Publication Data
US 2024/0015456 A1 Jan. 11, 2024

Related U.S. Application Data

(60) Provisional application No. 63/068,147, filed on Aug. 20, 2020.

(51) Int. Cl.
*H04R 25/00* (2006.01)
*H04R 25/02* (2006.01)

(52) U.S. Cl.
CPC .......... *H04R 25/606* (2013.01); *H04R 25/02* (2013.01); *H04R 25/402* (2013.01); *H04R 25/602* (2013.01)

(58) Field of Classification Search
CPC .......... H04R 25/606; H04R 2225/0216; H04R 25/604
See application file for complete search history.

(56) References Cited

U.S. PATENT DOCUMENTS 4,628,907 A * 12/1986 Epley .................. H04R 25/606 381/322
4,756,312 A * 7/1988 Epley .................. H04R 25/606 607/57

(Continued)

FOREIGN PATENT DOCUMENTS

EP 1968347 A2 * 9/2008 .......... H04R 25/606

OTHER PUBLICATIONS

Supplemental Partial EP Search Report dtd Aug. 29, 2024 for European Appn. No. 21859224.4, 15 pgs.

(Continued)

*Primary Examiner* — Ryan Robinson
(74) *Attorney, Agent, or Firm* — Brooks Kushman P.C.

(57) ABSTRACT

A direct hearing device includes an inner actuator element that interacts with a subject's tympanic membrane, the inner actuator element sitting in the subject's ear canal. The direct hearing device further includes an outer component that houses a microphone, circuitry that processes a signal from the microphone, and a battery. The outer component is configured to sit laterally in the subject's ear canal. Advantageously, the outer component is separable form the inner actuator element.

25 Claims, 16 Drawing Sheets

(56) References Cited

U.S. PATENT DOCUMENTS

| | | | | | |
|---|---|---|---|---|---|
| 5,259,032 | A * | 11/1993 | Perkins | H04R 25/554 | 381/328 |
| 5,411,467 | A | 5/1995 | Hortmann et al. | | |
| 5,701,348 | A * | 12/1997 | Shennib | H04R 25/456 | 381/328 |
| 6,137,889 | A * | 10/2000 | Shennib | H04R 25/456 | 181/134 |
| 6,940,989 | B1 * | 9/2005 | Shennib | H04R 25/606 | 381/328 |
| 8,340,335 | B1 * | 12/2012 | Shennib | H04R 25/604 | 381/328 |
| 8,885,860 | B2 * | 11/2014 | Djalilian | H04R 5/00 | 381/326 |
| 10,492,010 | B2 * | 11/2019 | Rucker | H04R 25/606 | |
| 10,536,788 | B2 * | 1/2020 | Nikles | H04R 25/554 | |
| 10,863,285 | B2 * | 12/2020 | Schmidt | H04R 25/60 | |
| 11,516,603 | B2 * | 11/2022 | Dy | H04R 25/656 | |
| 2002/0085728 | A1 | 7/2002 | Shennib et al. | | |
| 2010/0272299 | A1 | 10/2010 | Van Schuyenbergh | | |
| 2012/0308062 | A1 | 12/2012 | Djalilian et al. | | |
| 2016/0094922 | A1 * | 3/2016 | Øllgaard | H04R 25/652 | 600/25 |
| 2019/0230449 | A1 | 7/2019 | Puria | | |
| 2021/0211811 | A1 * | 7/2021 | Fritzsche | H04R 25/556 | |

OTHER PUBLICATIONS

PCT International Search Report and Written Opinion dated Dec. 6, 2021 issued in connection with related PCT Application No. PCT/US2021/046967.

* cited by examiner

DIRECT DRIVE HEARING AID STIMULATION METHODS

CROSS-REFERENCE TO RELATED APPLICATIONS

This application is the U.S. national phase of PCT Appln. No. PCT/US2021/046967 filed Aug. 20, 2021, which claims the benefit of U.S. provisional application Ser. No. 63/068,147 filed Aug. 20, 2020, the disclosure of which is hereby incorporated in its entirety by reference herein.

TECHNICAL FIELD

In at least one aspect, the present invention is related to is related to direct hearing devices.

BACKGROUND

Hearing loss affects approximately 10% of the population in the developed world. There are currently approximately 30 million in the U.S. who have hearing loss. Normally, hearing is improved using a hearing aid that is placed within the ear canal. The hearing aid takes sound and converts it into louder sound, which vibrates the eardrum, which in turn vibrates the ossicles (middle ear bones), and that vibrates the inner ear fluids via the oval window. The hearing organ (cochlea) can also be stimulated via the round window (another membranous window of the inner ear).

Currently, only implantable devices can provide higher quality sound than a regular hearing aid. A new class of hearing devices (direct drive hearing aids) directly move the eardrum and can provide a higher quality sound than conventional aids and are closer in quality of sound to the implantable hearing aids. We have previously patented a device that directly drives the tympanic membrane.

Accordingly, there is a need for improved direct hearing devices.

SUMMARY

In at least one aspect, a direct hearing device includes an inner actuator element that interacts with a subject's tympanic membrane. Characteristically, the inner actuator element is positionable in a subject's ear canal. A direct hearing device is in communication with the inner actuator element. The outer component includes a microphone, signal processing circuitry that processes a signal from the microphone, and a battery disposed in a housing. Advantageously, the outer component is removable and/or separatable from the inner actuator.

In another aspect, the inner actuator element includes a mechanical transducer that moves a tip assembly response to an output signal from the signal processing circuitry.

In another aspect, the mechanical transducer includes a voice coil.

In another aspect, the mechanical transducer includes an electromagnet, a first flexure, a second flexure, and at least one magnet positioned between the first flexure and the second flexure, the electromagnet being in electrical communication with the signal processing circuitry such that the at least on magnet is move responsively to the output signal from the signal processing circuitry with motion of the at least one magnet transfer to the tip assembly.

In at least one aspect, the direct hearing device can drive the tympanic membrane.

In another aspect, the direct hearing device substantially reduces the cost of the semi-implantable hearing device.

In another aspect, the direct hearing device provides a much higher quality sound than the current hearing devices.

In another aspect, the outer component can be removed and replaced such that the inside device will stay abutted to the eardrum. This allows for the high-quality sound to be given to the patient and the outside component could be removed (e.g., for charging the battery, etc.).

In another aspect, the battery component of the direct hearing device can be removed for battery replacement or recharging. This allows the actuator to stay attached to the tympanic membrane for an extended period of time.

In another aspect, energy is transferred from the outer component to the inner actuator element via radiofrequency stimulation. In another refinement, energy is transferred from the outer component to the inner actuator element via a light-based transmission and translation into mechanical motion.

In another aspect, energy is transferred from the outer component to the inner actuator element via aligned coils.

In another aspect, the outer component can lock in and connect to the inner actuator element using an electromagnet.

In another aspect, the electromagnetic coupling can be activated and deactivated by a user or caregiver or medical provider such that the electromagnetic coupling or another coupling can be disengaged and allow separation of the outer component of the direct hearing device.

In another aspect, the inner actuator element includes an actuator tip contacts the lateral process of the malleus.

In another aspect, the inner actuator element includes an actuator tip and a shaft with a flexible joint between the actuator tip and the shaft, thereby allowing the actuator tip to conform to the tympanic membrane. In a refinement, the actuator tip comes in a kit configured to provide various angles between the shaft of the inner actuator element and the tympanic membrane allowing it to be fitted to multiple patients.

In still another aspect, the direct hearing device is configured to allow placement of the direct hearing device in a subject while playing sound wherein once the direct hearing device contacts the tympanic membrane, the patient will perceive sound and indicate proper placement of the direct hearing device.

In still another aspect, the direct hearing device is secured in the ear canal using a passive system.

In still another aspect, the direct hearing device is secured in the ear canal using an active system that allows the direct hearing device to be engaged or disengaged from the ear canal.

In still another aspect, the outer component includes an oil reservoir configured to place oil in the subject's ear canal or on a patient's eardrum using a passive or active system.

In still another aspect, a refillable or non-refillable oil reservoir is placed in the ear canal.

In still another aspect, the battery can be charged wirelessly while the device is in place in the ear canal or behind the ear.

In still another aspect, the outer component can lock in and/or connect to the inner actuator element using a piezoelectric system.

In yet another aspect, an insertion device for the direct hearing device is provided. The insertion device is configured to slowly advances the direct hearing device into the ear canal while sound is played from the direct hearing device. Once the direct hearing device is in contact with the tympanic membrane and sound is generated, a user or medical provider can stop the advancement of the direct hearing device.

In yet another aspect, advancement of the insertion device halts once the direct hearing device meets a certain threshold of resistance or if sound is perceived by the patient/user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1A:
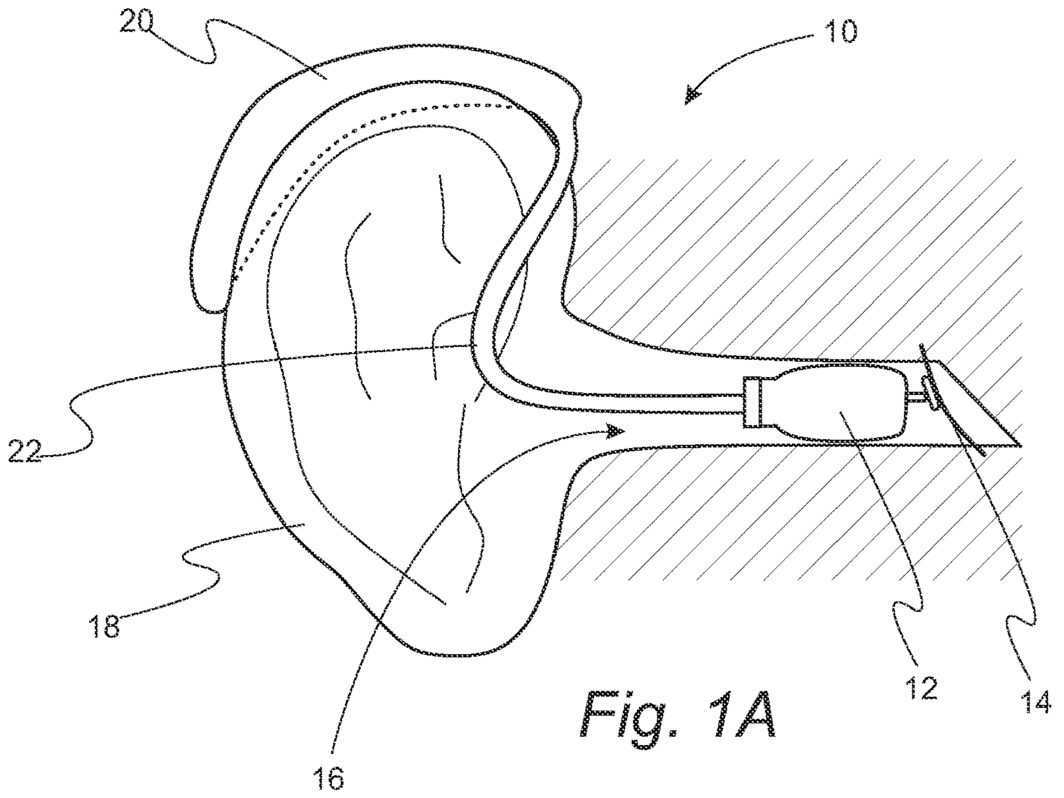
FIG. 1A. Schematic of a direct hearing device placed in a subject's ear.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that any given signal that has a non-zero average value for voltage or current includes a D.C. signal (that may have been or is combined with an A.C. signal). Therefore, for such a signal, the term "D.C." refers to the component not varying with time and the term "A.C." refers to the time-varying component. Appropriate filtering can be used to recover the A.C. signal or the D.C.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "electrical signal" refers to the electrical output from an electronic device or the electrical input to an electronic device. The electrical signal is characterized by voltage and/or current. The electrical signal can be stationary with respect to time (e.g., a D.C. signal) or it can vary with respect to time.

The term "electronic component" refers is any physical entity in an electronic device or system used to affect electron states, electron flow, or the electric fields associated with the electrons. Examples of electronic components include, but are not limited to, capacitors, inductors, resistors, thyristors, diodes, transistors, etc. Electronic components can be passive or active.

The term "electronic device" or "system" refers to a physical entity formed from one or more electronic components to perform a predetermined function on an electrical signal.

It should be appreciated that in any figures for electronic devices, a series of electronic components connected by lines (e.g., wires) indicates that such electronic components are in electrical communication with each other. Moreover, when lines directed connect one electronic component to another, these electronic components can be connected to each other as defined above.

Abbreviations:

"PLZT" means lead lanthanum zirconate titanate.

Figure 1B:
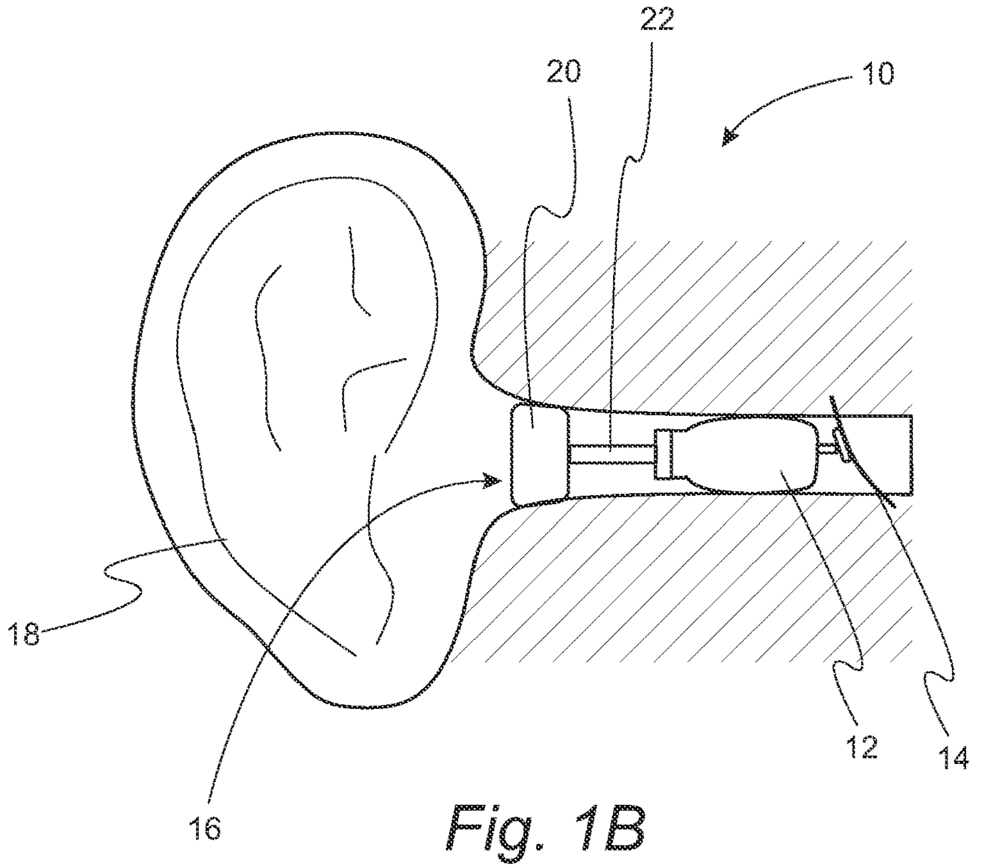
FIG. 1B. Schematic of a direct hearing device placed in a subject's ear.

With reference to FIGS. 1A and 1B, direct hearing devices are schematically illustrated. FIG. 1A is a variation in which the electronics are housed behind the ear while FIG. 1B depicts a variation in which the electronics are housed within the ear canal. Direct hearing device 10 includes an inner actuator element 12 that interacts with a subject's tympanic membrane 14. Characteristically, inner actuator element 12 sits in the subject's ear canal 16. The direct hearing device 10 also includes an outer component 20 that houses electronics, a microphone, and a battery. In a refinement, outer component 20 is configured to be positioned laterally in the subject's ear canal relative to inner actuator element 12. Advantageously, outer component 20 is removable (e.g., for charging the battery) and separatable from inner actuator elements. In the variation of FIG. 1A, outer component 20 is positioned behind the subject's ear 18. In the variation of FIG. 1B, outer component 20 is positioned in ear canal 16. In a refinement, tube connector 22 attaches inner actuator element 12 to outer component 20 with electrical wires and connection components disposed therein. In a variation, the inner actuator element 12 includes an actuator tip that contacts the lateral process of the malleus. In another variation, direct hearing device 10 is configured to allow placement of the direct hearing device in a subject while playing sound. Once the direct hearing device contacts the tympanic membrane, the patient will perceive sound and indicate proper placement of the direct hearing device.

Figure 2A:
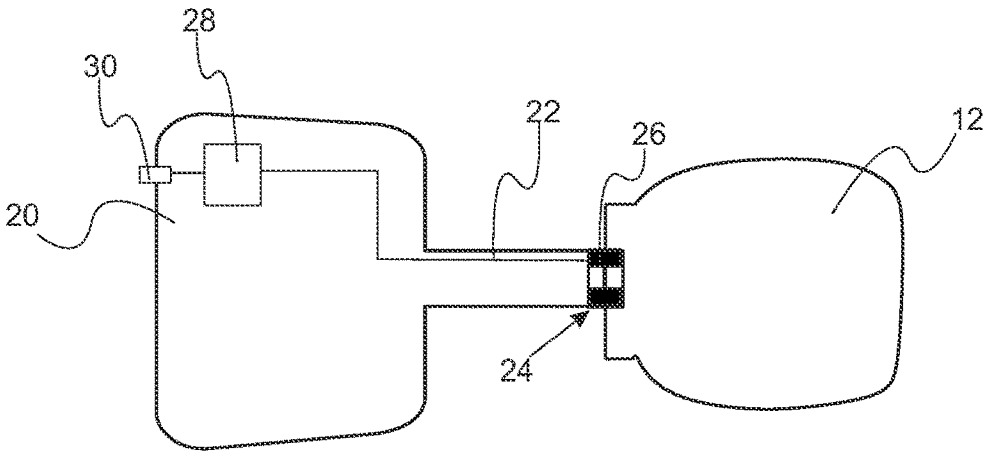
FIG. 2A. Schematic of a direct hearing device illustrating a tube connector integral to the outer component.
Figure 2B:
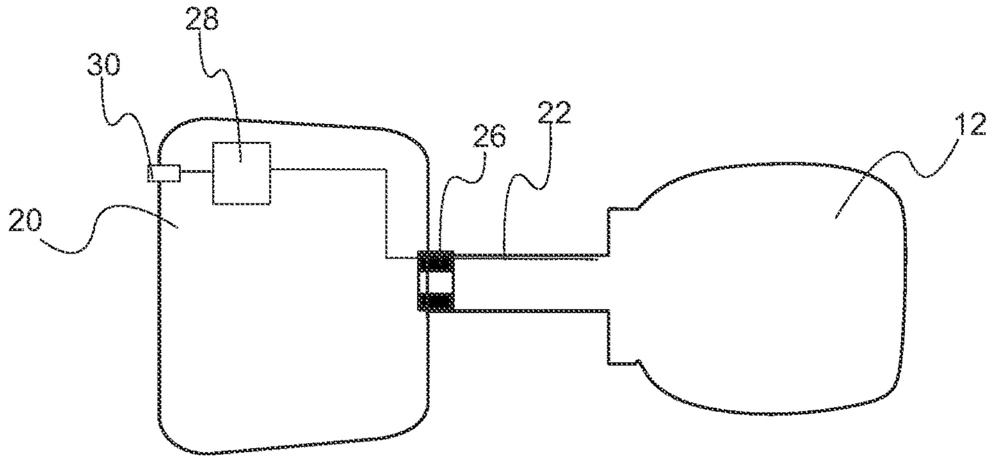
FIG. 2B. Schematic of a direct hearing device illustrating a tube connector integral to the inner actuator component.
Figure 2C:
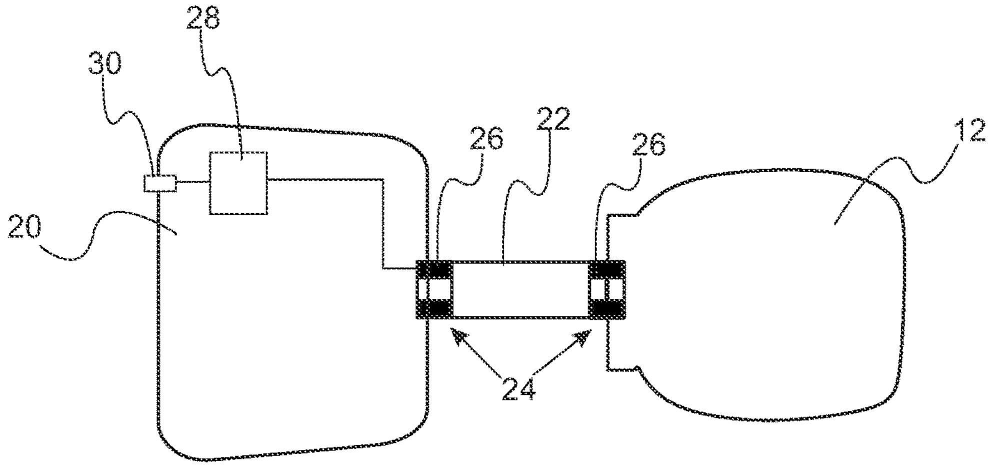
FIG. 2C. Schematic of a direct hearing device illustrating a tube connector that is a separate component.
Figure 2D:
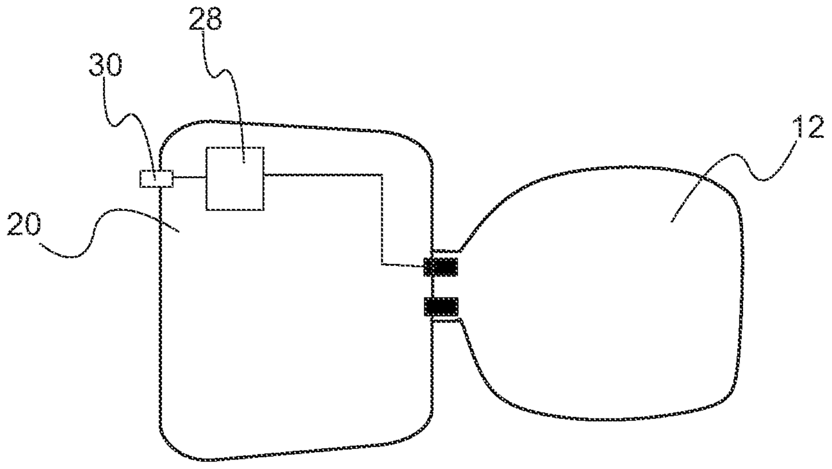
FIG. 2D. Schematic of a direct hearing device without a tube connector between the outer component and the inner actuator component.

FIGS. 2A, 2B, 2C, and 2D provide schematics of various arrangements for attaching inner actuator element 12 to outer component 2. In FIG. 2A, tube connector 22 is an integral part of outer component 20. In FIG. 2B, tube connector 22 is an integral part of inner actuator element 12. In FIG. 2C, tube connector 22 is a separate component that is attached to both inner actuator element 12 and outer component 20. In each scenario connectors 24 are used to connect the components. In a refinement, connectors 24 include connections elements 26 that can be an electromagnetic locking mechanism, a piezoelectric lock locking mechanism, or a mechanical locking mechanism. The electromagnet locking mechanism will include at least one electromagnet as connection elements 26. In a refinement, connectors 24 are in electrical communication with and driven by switch control circuits 28. A user selected the locked or unlocked state with switch 30.

Figure 3A:
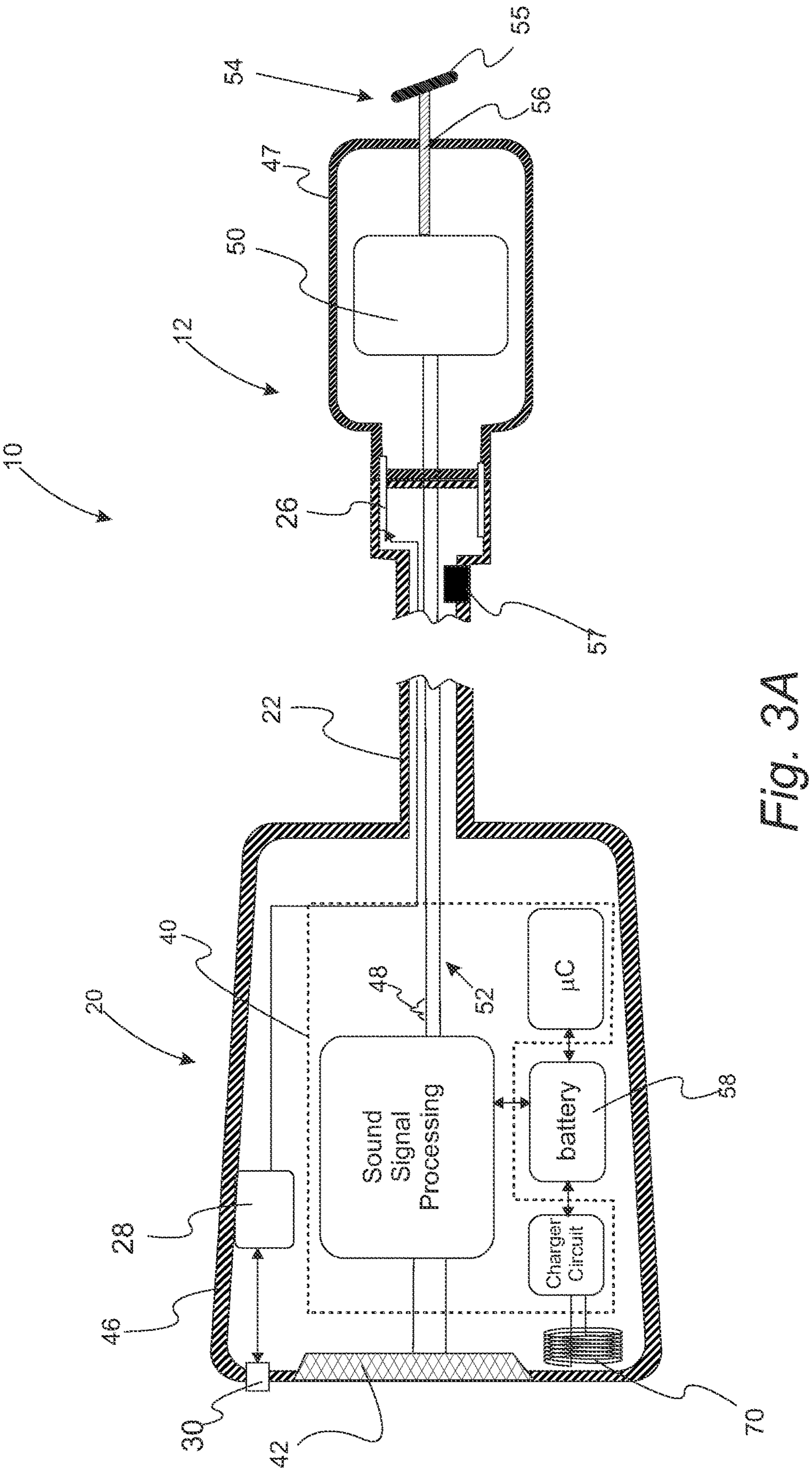
FIG. 3A. Schematic of a direct hearing device in which wires carrying signals from the outer component to the inner actuator element.
Figure 3B:
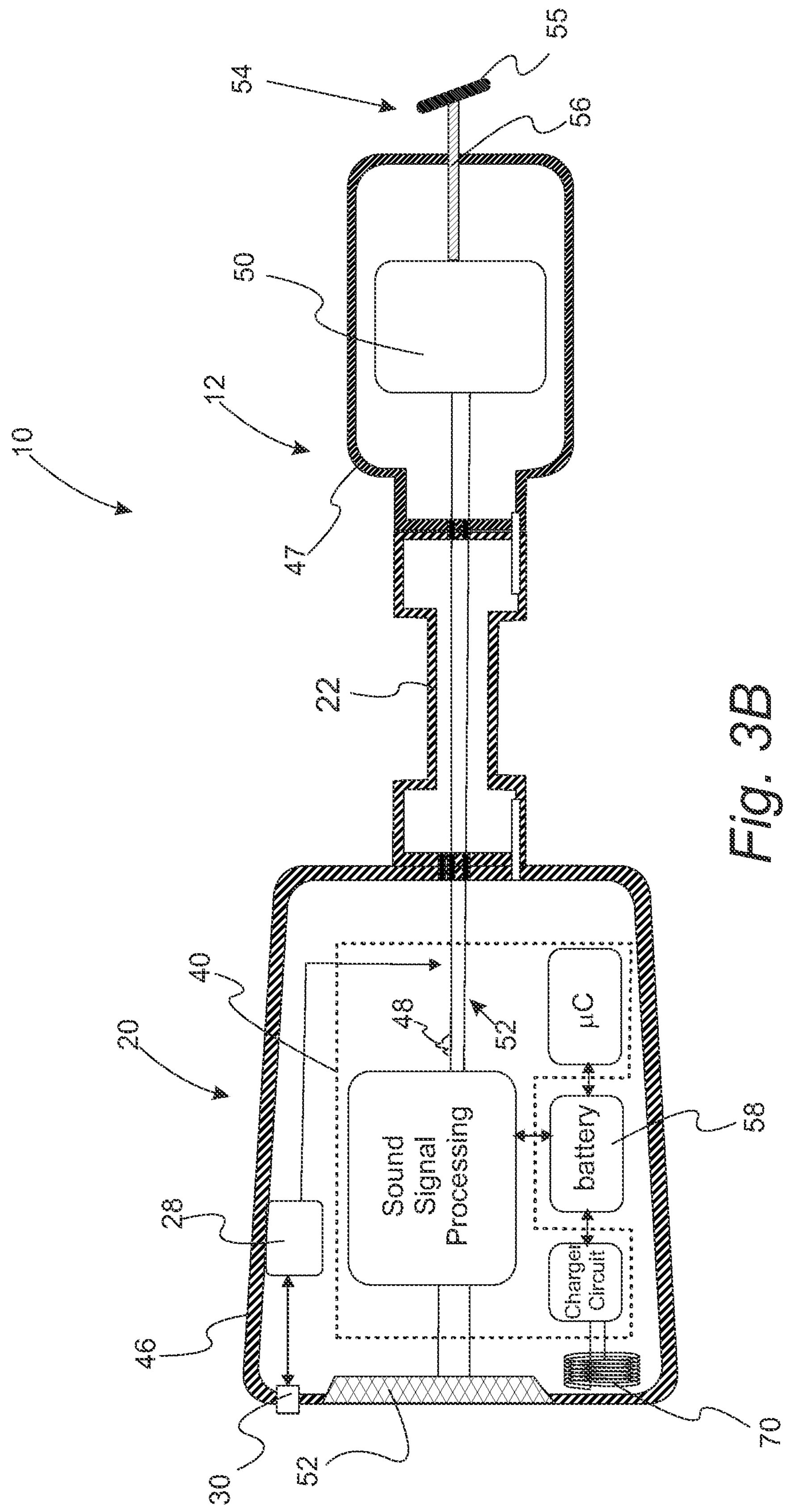
FIG. 3B. Schematic of a direct hearing device in which wires carrying signals from the outer component to the inner actuator element.
Figure 3C:
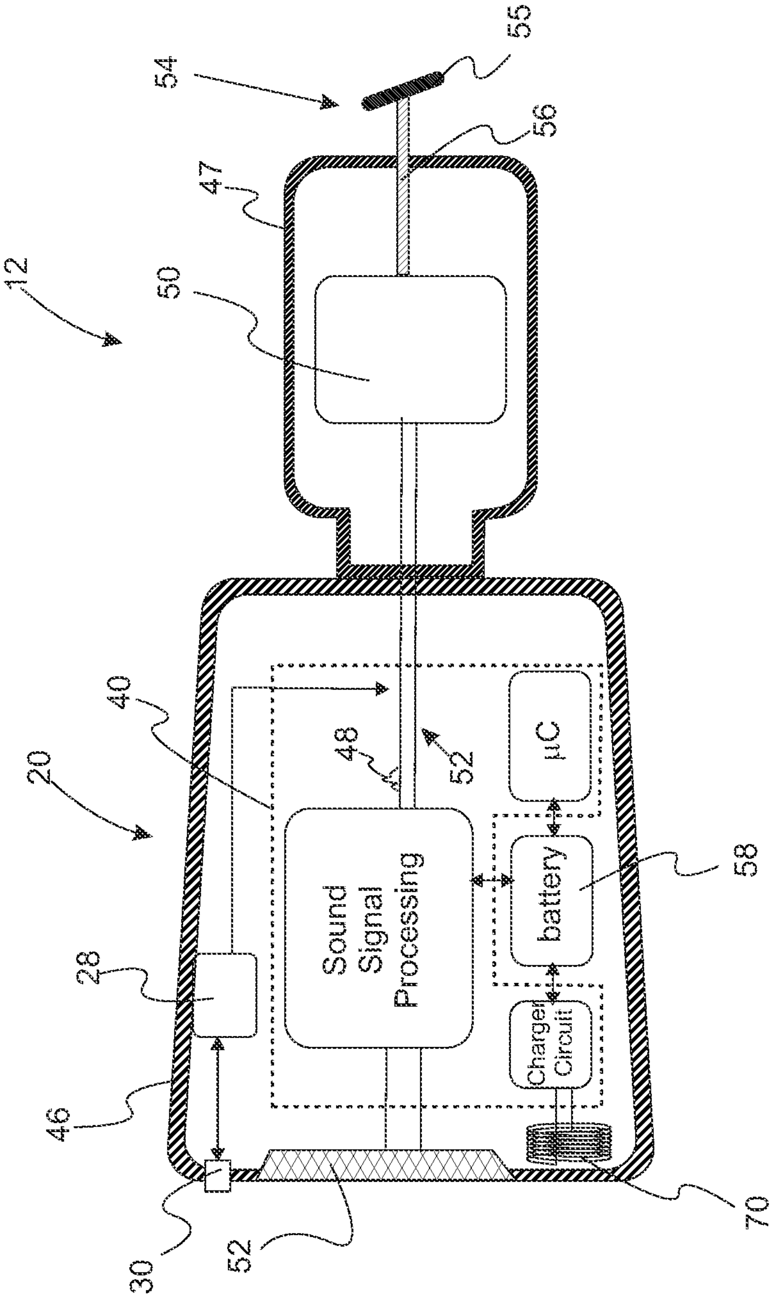
FIG. 3C. Schematic of a direct hearing device in which wires carrying signals from the outer component to the inner actuator element.
Figure 3D:
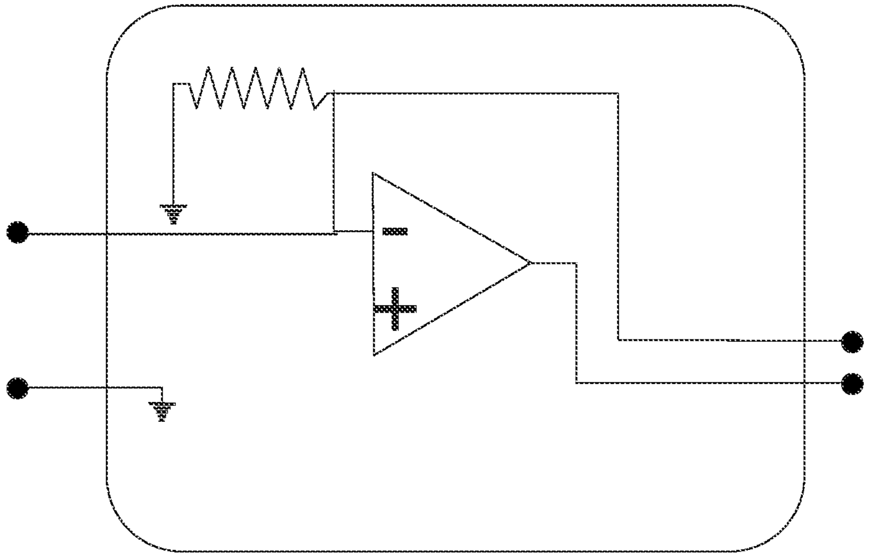
FIG. 3D. Schematic of a voltage to current circuit that can be used in the direct hearing devices of FIGS. 3A-C.

FIGS. 3A, 3B, and 3C provide cross-sectional schematics of direct hearing device 10 including inner actuator element 12 and outer component 20. Outer component 20 includes circuitry which includes one or more elements for signal processing, recharging, programming, and additional functions of the hearing aid device. When outer component 20 is placed in the ear canal, as depicted in FIG. 1B, microphone 42 faces the entrance of the ear canal when worn. Sound is received by microphone 42 and circuitry 40 processes the received sound signal. The signal process circuitry of circuitry 40 can include amplifiers, voltage to current circuits as depicted in FIG. 3D, pulse-width modulation (PWM) circuits, or pulse-duration modulation (PDM) circuits, and the like. PWM circuits and/or or PDM circuits are particularly useful for light coupling as described in international patent Appl. No. WO2009155358A1; the entire disclosure of which is hereby incorporated by reference. In another variation particularly suitable for optical coupling, circuitry 40 can incudes a pulse generator so that light pulses modulated by the sound signal are transmitted. In another refinement, circuitry 40 can includes a control component such as a microprocessor or any control component for control the sound signal processing. Microphone 42 is located at the end of outer component 20. Details for components of circuitry 40 are found in U.S. Pat. No. 9,407,994B2; the entire disclosure of which is hereby incorporated by reference. Microphone 42 is located at the end of outer component 20. Details for components of circuitry 40 are found in U.S. Pat. No. 9,407,994B2; the entire disclosure of which is hereby incorporated by reference. Outer component 20 includes housing 46, which provides one or more features to hold the hearing aid device comfortably in place. Outer component 20 can include one or more elements to reduce sound from reaching one or more portions of the ear canal, tympanic membrane, middle ear, or inner ear. In one refinement, housing 46 may completely seal the ear canal and prevent natural sound from reaching the tympanic membrane. In another refinement, housing 46 can be designed with baffles to impede sound from reaching the tympanic membrane while allowing the pressure to equalize between both sides of the device. Housing 46 may be designed to have no sealing (non-occluding) and allow free passage of sound. Housing 46 can also be designed to be flexible to allow relative movements between components to allow the device to better conform to the ear canal. Similarly, inner actuator element 12 includes housing 47. Housing 46 and 47 can be composed of a polymer and in particular, a soft polymer or plastic. As depicted in FIGS. 3A, 4, and the output signal 48 from circuitry 40 is carried to mechanical transducer 50 in inner actuator element 12 via wires 52. Mechanical transducer 50 moves tip assembly 54 in a manner responsive to output signal 48 such that the tympanic membrane is moved accordingly. The energy transfer device transfers energy by electromagnetic coupling (e.g., inductive coupling and radiofrequency coupling), direct wiring, and optical coupling as set forth below in more detail.

In a refinement, tip assembly 54 includes tip 55 mounted on shaft 56. In still another variation, the outer component 20 includes an oil reservoir 57 configured to place oil in the ear canal or on the eardrum using a passive or active system. In a refinement, a refillable or non-refillable oil reservoir 57 is placed in the ear canal. As user can optionally cause oil to be released from oil reservoir 57 or oil can be passively released.

Figure 4A:
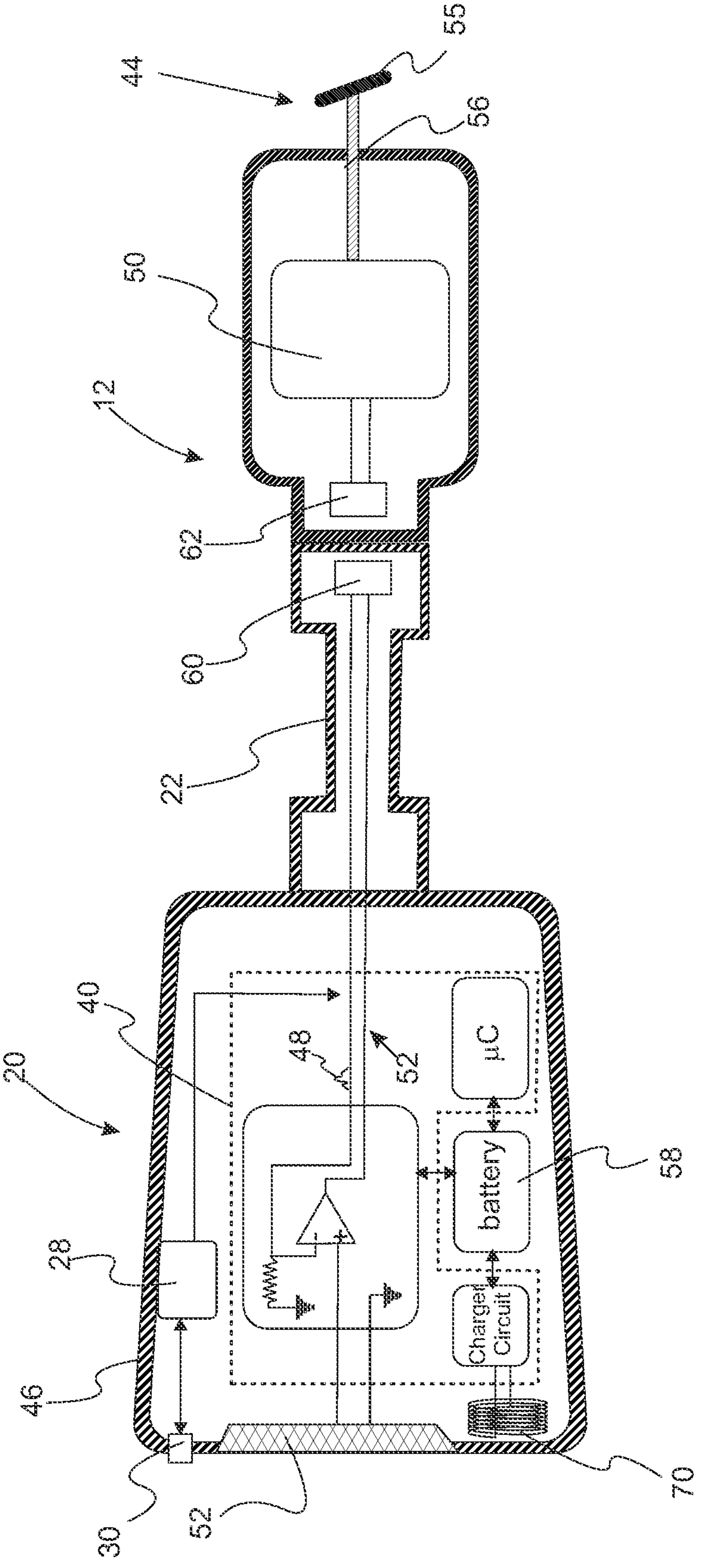
FIG. 4A. Schematic of a direct hearing device in which energy is transmitted wirelessly from the outer component to the inner actuator element.
Figure 4B:
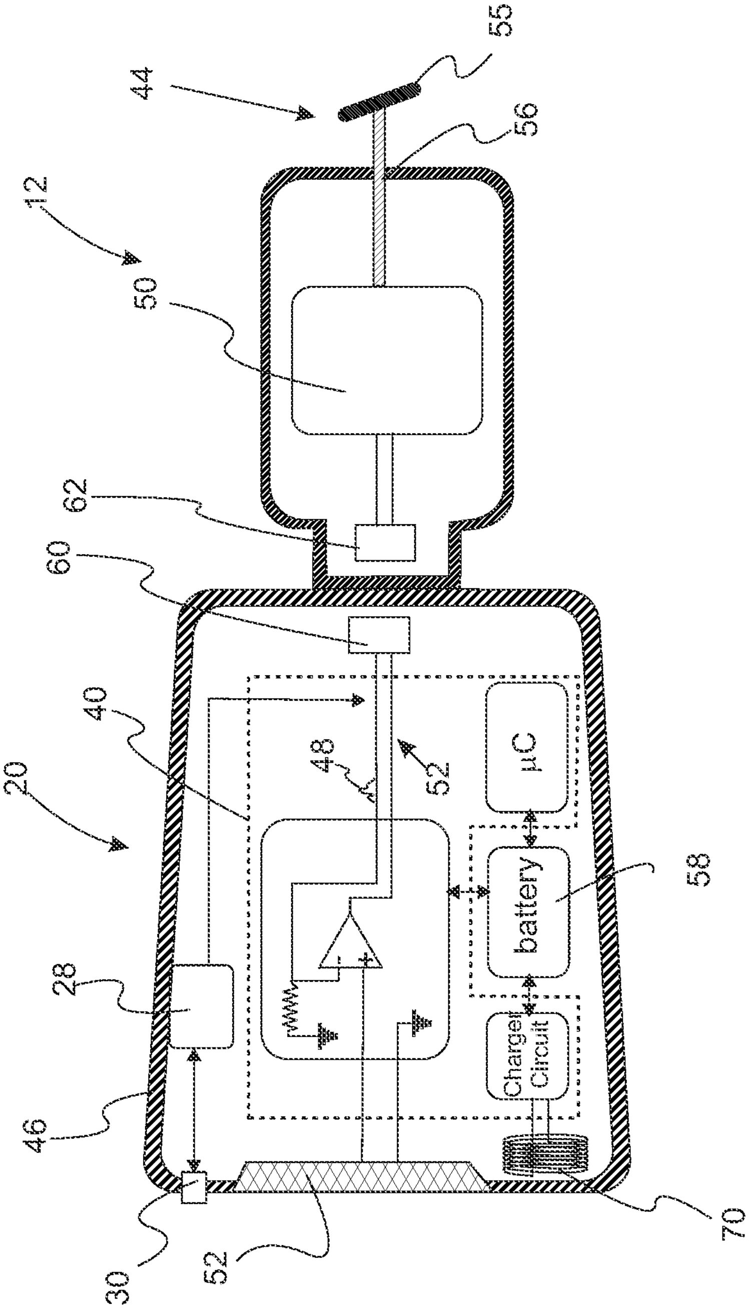
FIG. 4B. Schematic of a direct hearing device in which energy is transmitted wirelessly from the outer component to the inner actuator element.

FIGS. 4A and 4B illustrate variations in which wires are not used to transfer a sound signal from the out component 20 to the inner actuator component 12. As set forth above, outer component 20 includes circuitry 40, which includes one or more elements for signal processing, recharging, programming, and additional functions of the hearing aid device. Microphone 42 is located at the end of outer component 20. When outer component 20 is placed in the ear canal as depicted in FIG. 1B, microphone 42 faces the entrance of the ear canal when worn. Sound is received by microphone 42 and circuitry 40 processes the received sound signal. As set forth above, outer component 20 includes housing 46, which provides one or more features to hold the hearing aid device comfortably in place, while inner actuator element 12 includes housing 47. The output signal 48 from circuitry 40 is carried to energy transmitter 60 positioned in outer component 20 or at the vicinity of the connection of outer component 20 to inner actuator element 12 positioned in outer component 20 via wires 52. Energy transmitter 60 sends a signal that is received by receiver 62. In a variation, energy is transferred from the outer component 20 to inner actuator element 12 using electromagnetic energy, and in particular, by stimulation by electromagnetic waves (e.g., radiofrequency stimulation).

In a refinement, the energy is transferred by radiofrequency stimulation where transmitter 60 is a radio frequency transmitter and receiver 62 is a radiofrequency receiver. In a further refinement, the radio frequency stimulation is in the range 20 kHz to around 300 GHz. In should be appreciated that electromagnet waves having a frequency less than 20 kHz and greater that 300 GHz can also be used.

In another variation, the energy is transferred optically where transmitter 60 is a light source, and receiver 62 includes a photodetector. Mechanical transducer 50 is in electrical communication with receiver 62. As set forth above, mechanical transducer 50 moves tip assembly 54 in a manner responsive to output signal 48 such that the tympanic membrane is moved accordingly.

Referring to FIGS. 3A, 3B, 3C, 4A, and 4B, battery 48 can power direct hearing device 10. In a refinement, charging interface 80 is used to recharge battery 58. In a refinement, charging interface 70 is a recharge coil 70 that can recharge battery 58 via inductive coupling to an external power source. In another refinement, charging interface 70 is a photocell. In still another refinement, In another refinement, charging interface 70 is an electronic connector that allows charging with an external power source. In some refinements, recharging of battery 58 is not a requirement for successful implementation of the device.

Figure 5A:
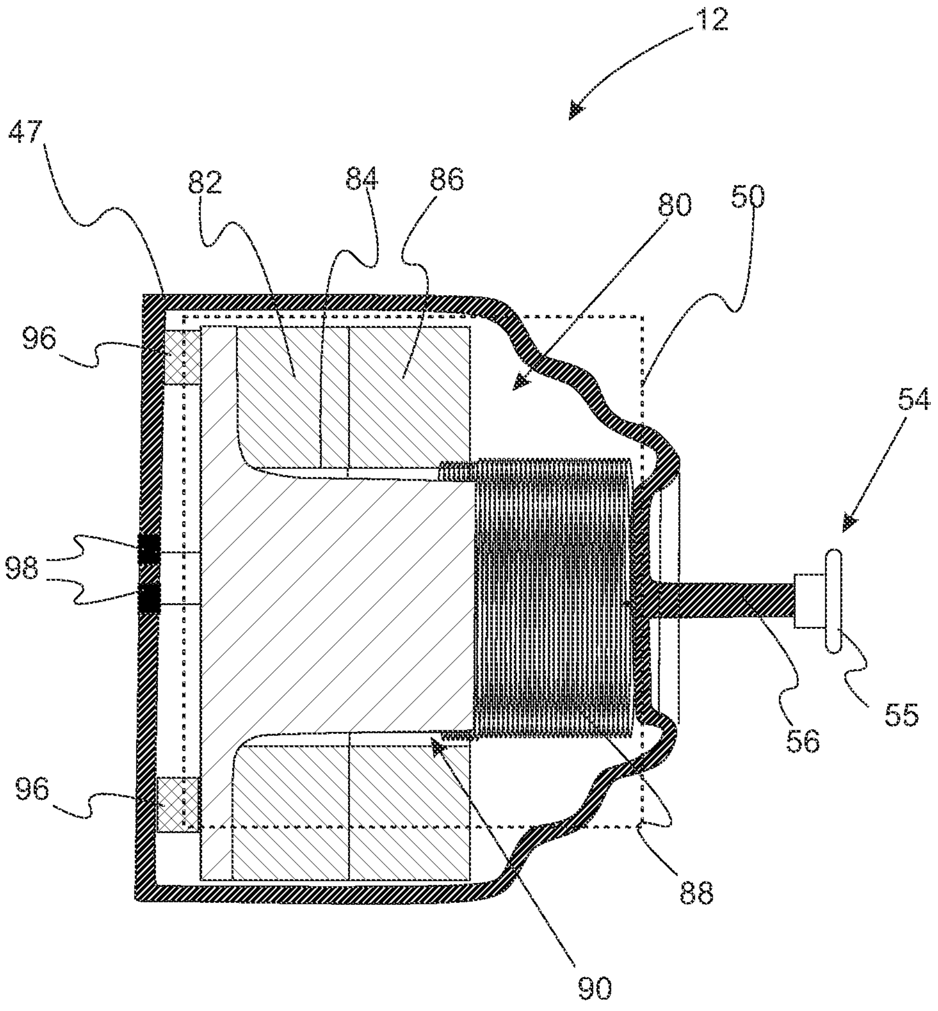
FIG. 5A. Schematic of the inner actuator transducer having a mechanical transducer that includes a voice coil.

FIG. 5A depicts a variation of inner actuator element 12 that includes a mechanical transducer 50 that includes a voice coil. The variation depicted is useful in the direct hearing devices depicted in FIGS. 3A, 3B, and 3C. Mechanical transducer 50 includes a voice coil actuator 80 that includes a magnet 82, inner flux guide 84, outer fluxes guide 86 and voice coil 88. Circuitry 40 from outer component 20 drives current through voice coil 88 and a force is produced along, or at an angle to, the axis of inner actuator element 12 due to its interaction with the magnetic field in air gap 90. In certain variation, this force will drive tip assembly 54, which will be in contact with a portion of the ear, such as a portion of the ear canal, the tympanic membrane, or the umbo. The portion of the ear, such as the umbo, will displace from these forces and ultimately, sound is perceived by the user. Preload spring(s) 96 will hold interface tip assembly 54 in contact with the ear canal, the tympanic membrane, or the umbo. Details for components of mechanical transducer 50 are found in U.S. Pat. No. 9,407,994B2; the entire disclosure of which is hereby incorporated by reference. In a refinement, inner actuator element 12 also includes contact pads 98 that receive the sound signal 48. Contact pads 98 are in electrical communication with voice coil 88 provide a varying current thereto related to the sound incident on the microphone in the outer component 20.

Figure 5B:
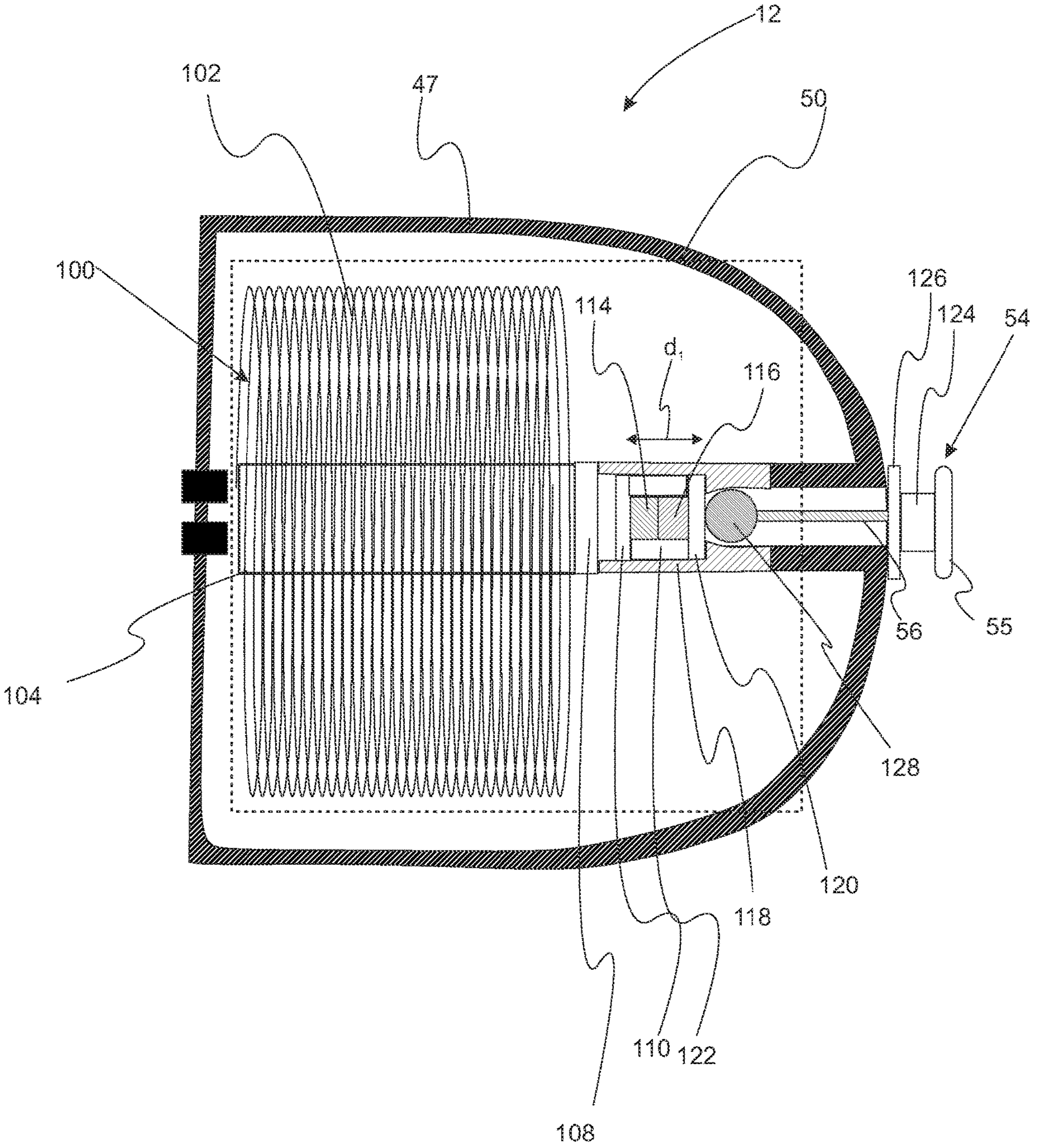
FIG. 5B. Schematic of the inner actuator transducer having a mechanical transducer that includes at least one magnet positioned between two flexures.

FIG. 5B depicts a variation of inner actuator element 12 that includes magnets held between two flexible flexures moving in response to an induced time vary magnetic field. Mechanical transducer 50 includes electromagnet 100 which includes coil 102 surrounding magnet core 104. Optional minor annulus 108 is interposed between and optionally contacts electromagnet 100 and first flexure 110. At least one magnet 114 contacts at least one flexure 110. Flexures can be flexible membranes, pads, sheet, and the like. Flexures can be composed of rubber or a flexible plastic. In a refinement, at least one magnet 114 is interposed between a first flexure 110 and a second flexure 120. In a refinement, magnets 114 and 116 are positioned between first flexure 110 and second flexure 120. Spacer ring 122 is also disposed between first flexure 110 and second flexure 120, allowing the magnets to move within the central opening defined by spacer ring 122. Spacer ring 122, first flexure 110 and second flexure 120 are positioned in and held by sheath tube 118. Permanent magnets 114 and 116 move in response to the time-varying magnetic field from electromagnet 100. This motion is permitted between the flexibility flexures 110 and 120. Moreover, the magnetic field is established from sound signal 48. The motion of permanent magnets 114 and 116 is transferred to tip assembly 54 which is in contact with a structure such as the tympanic membrane to provide sound perception to a user of the hearing device. In a refinement, tip assembly 54 includes tip 55 attached to connector 124 mounted on tip platform 126 which is attached to shaft 56. Ball joint 128 is attached to an end of shaft 56.

Figure 6A:
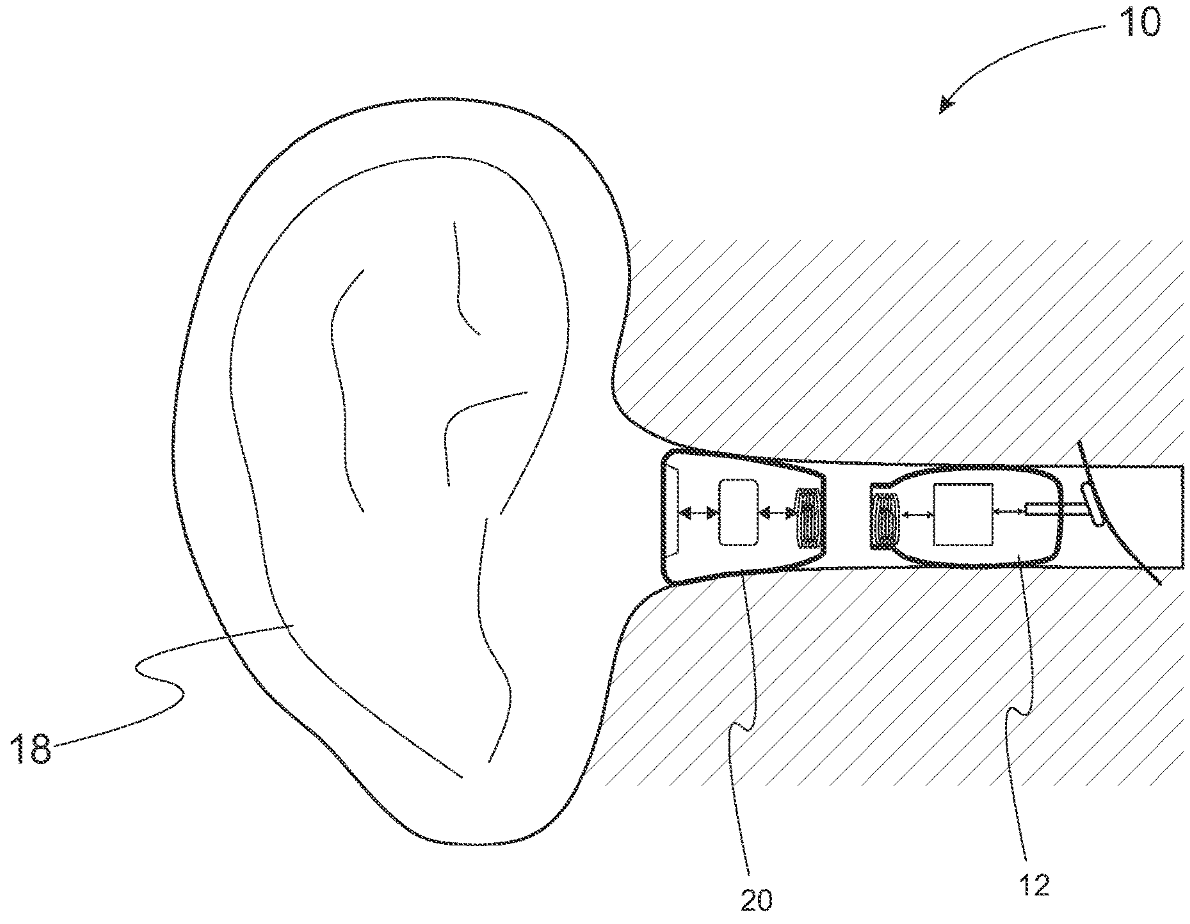
FIG. 6A. Schematic of a direct hearing device placed in a subject's ear in which the outer component transfers energy via inductive coupling to the inner actuator element.
Figure 6B:
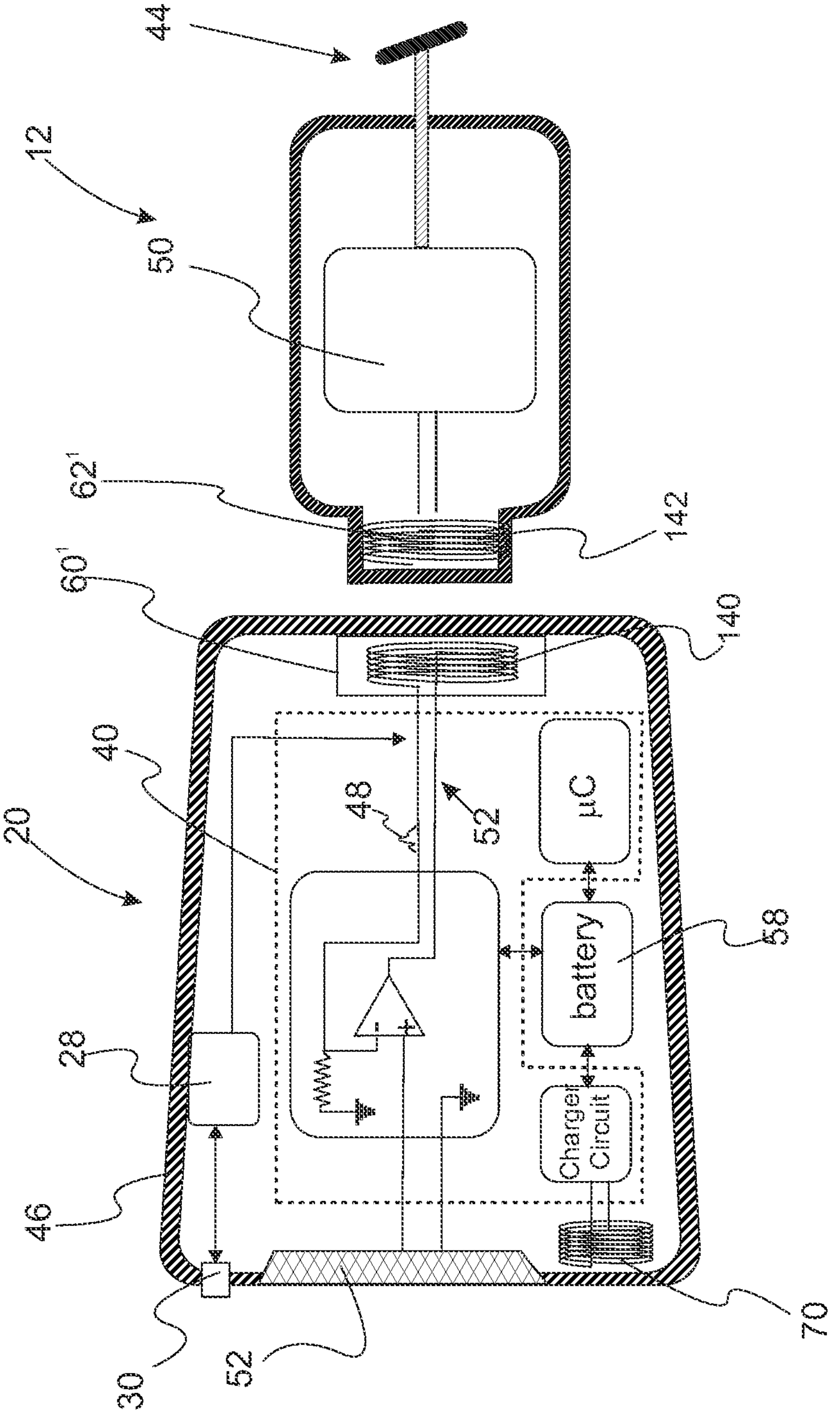
FIG. 6B. Schematic of a direct hearing device placed in a subject's ear in which the outer component transfers energy via inductive coupling to the inner actuator element.

Referring to FIGS. 6A and 6B, schematics showing energy transfer from outer component 20 and inner actuator component 12 via inductive coupling is provided. In a refinement, transmitter 60$^{1}$ is a radio frequency transmitter and receiver 62$^{1}$ is a radiofrequency receiver. As set forth above, outer component 20 includes circuitry 40, which includes one or more elements for signal processing, recharging, programming and additional functions of the hearing aid device. Microphone 42 is located at the end of outer component 20. When outer component 20 is placed in the ear canal as depicted in FIG. 1B, microphone 42 faces the entrance of the ear canal when worn. Sound is received by microphone 42 and circuitry 40 processes the received sound signal. Outer component 20 includes housing 46, which provides one or more features to hold the hearing aid device comfortably in place. Similarly, inner actuator element 12 includes housing 47. As depicted in FIGS. 3A, 3B, and 3C, the output signal 48 from circuitry 40 activated transmitter 60$^{1'}$ which includes a first coil 140. Energy is transferred to receiver 62$^{1'}$ which includes second coil 142. Second coil 142 activated in this manner provide input to mechanical transducer 50, which is in electrical communication with Second coil 142. As set forth above, mechanical transducer 50 moves tip assembly 54 in a manner responsive to the output signal 48 such that the tympanic membrane is moved accordingly. In a refinement, mechanical transducer 50 has the design described above for FIG. 5A, which includes a voice coil. In another refinement, mechanical transducer 50 has the design described above for FIG. 5B, which includes magnets held between two flexible flexures moving in response to an induced time vary magnetic field. As set forth above for FIG. 5B, mechanical transducer 50 can also include electromagnet 100, which includes coil 102 surrounding magnet core 104.

Figure 7A:
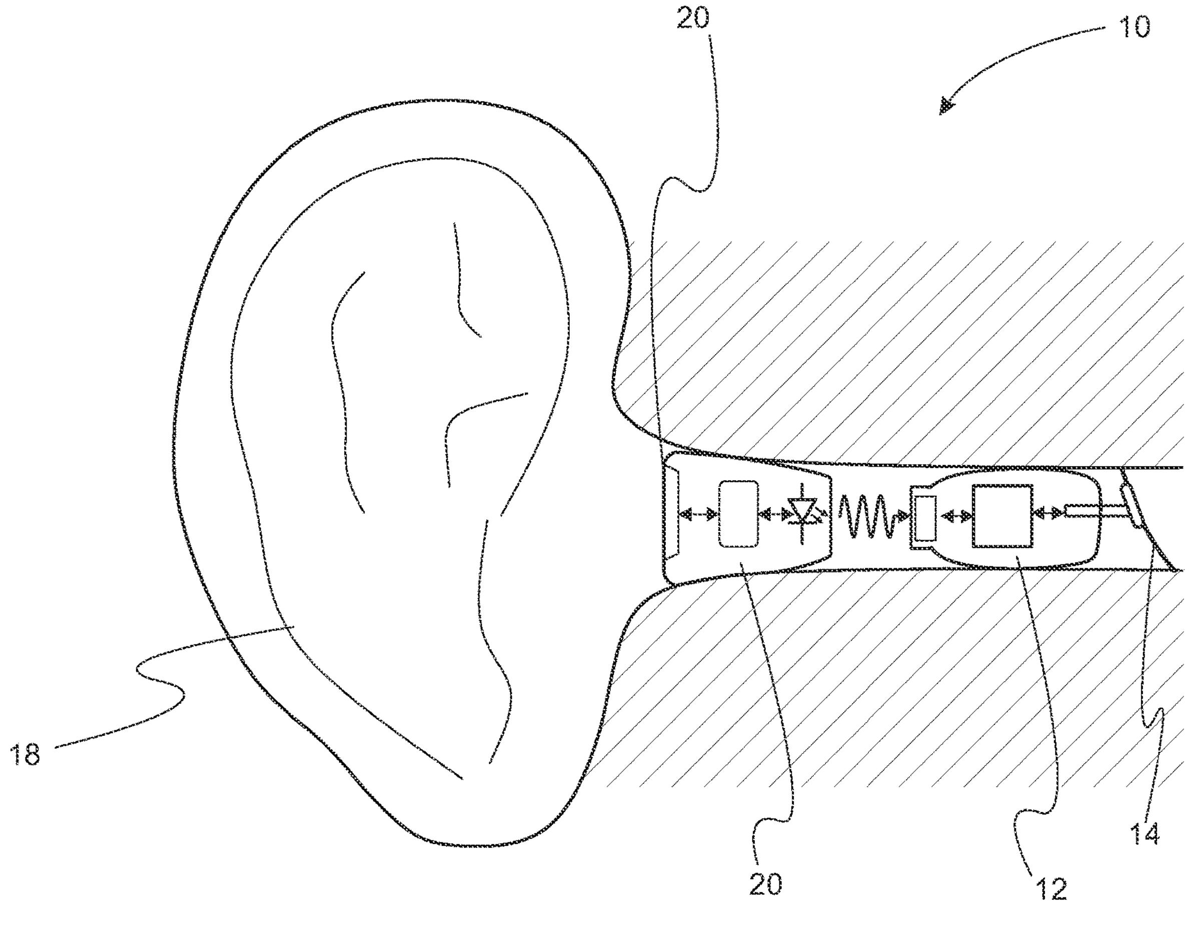
FIG. 7A. Schematic of a direct hearing device placed in a subject's ear in which the outer component transfers energy via optical coupling to the inner actuator element.
Figure 7B:
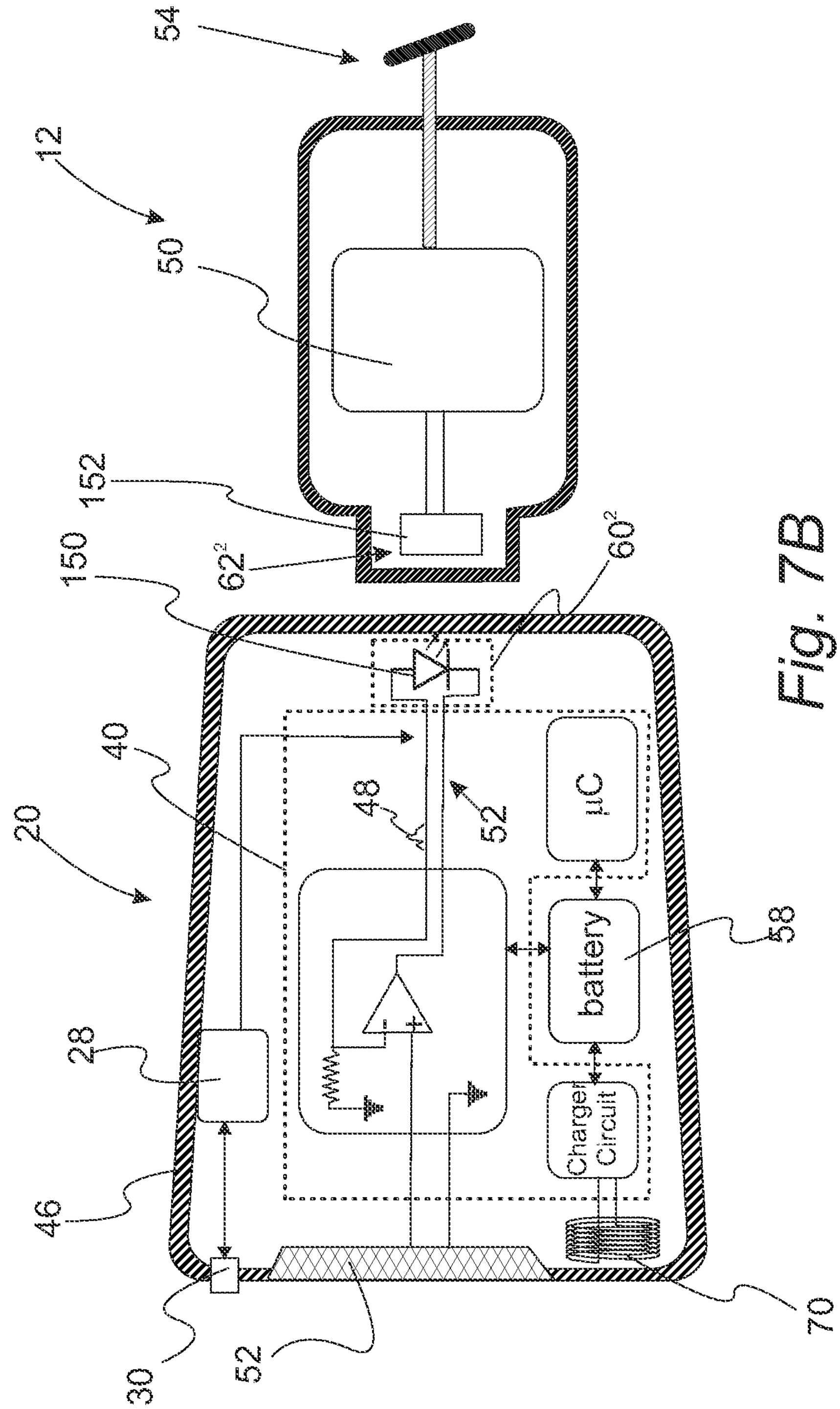
FIG. 7B. Schematic of a direct hearing device placed in a subject's ear in which the outer component transfers energy via optical coupling to the inner actuator element.

Referring to FIGS. 7A and 7B, schematics showing energy transfer from outer component 20 and inner actuator component 12 via a light-based transmission and translation into mechanical motion In this variation, transmitter 60$^{2}$ is a light source (e.g., a photodiode or laser diode) and receiver 62$^{2}$ is a photoresponsive device. As set forth above, outer component 20 includes circuitry 40, which includes one or more elements for signal processing, recharging, programming and additional functions of the hearing aid device. Microphone 42 is located at the end of outer component 20. When outer component 20 is placed in the ear canal, as depicted in FIG. 1B, microphone 42 faces the entrance of the ear canal when worn. Sound is received by microphone 42 and circuitry 40 processes the received sound signal. Outer component 20 includes housing 46, which provides one or more features to hold the hearing aid device comfortably in place. Similarly, inner actuator element 12 includes housing 47. The output signal 48 from circuitry 40 activates transmitter 60$^{2'}$ which includes a light source 150. Light is transferred to receiver 60$^{2'}$ which includes a photoresponsive device 152. In another refinement, photoresponsive device 152 includes a photocell (e.g., a photosensor diode or solar cell). In another refinement, photo responsive device 152 includes photostrictive materials (e.g., PLZT) are described in U.S. Pub. No. 2006/0189841; the entire disclosure of which is hereby incorporated by reference. The photostrictive material can be placed on a rod in communication with the tip or directly on the tip of tip assembly 54. Photoresponsive device 152 activated in this manner provides input to mechanical transducer 50, which is in electrical communication with photoresponsive device 152. As set forth above, mechanical transducer 50 moves tip assembly 54 in response to the output signal 48 such that the tympanic membrane is moved accordingly. In a refinement, mechanical transducer 50 has the design described above for FIG. 5A, which includes a voice coil. In another refinement, mechanical transducer 50 has the design described above for Figure which includes magnets held between two flexible flexures moving in response to an induced time vary magnetic field. As set forth above for FIG. 5B, mechanical transducer 50 can also include electromagnet 100, which includes coil 102 surrounding magnet core 104.

In still another variation, inner actuator element 12 includes an actuator tip and a shaft with a flexible joint between the actuator tip and the shaft, thereby allowing the actuator tip to conform to the tympanic membrane. In a refinement, the actuator tip comes in a kit configured to provide various angles between the shaft of the inner actuator element and the tympanic membrane allowing it to be fitted to multiple patients.

Figure 8:
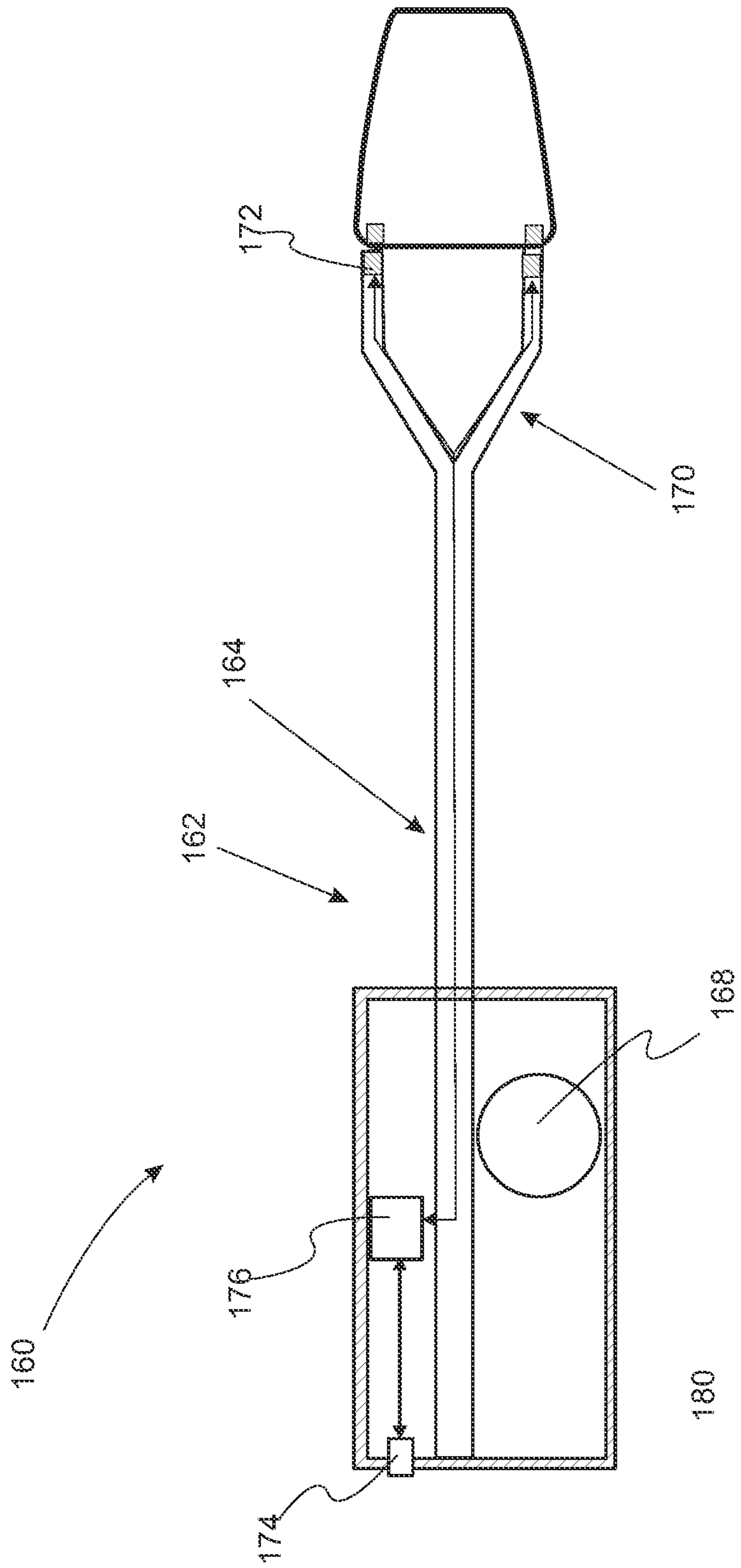
FIG. 8. Schematic of an insertion device for placement of direct hearing device in a subject's ear.

FIG. 8 provides a schematic of an insertion device for the direct hearing device 10. Insertion device 160 includes insertion member 162 having a rod section 164 and a grasping section 166 that can attach to inner actuator element 12 or outer component 20. Typically, insertion member 162 is composed of a polymer. Insertion device 160 includes torque motor system 168 that advances and retracts insertion member 162. The insertion device 166 is configured to slowly advances the direct hearing device into the ear canal while sound is played from the direct hearing device. Once the direct hearing device is in contact with the tympanic membrane and sound is generated, a user or medical provider can stop the advancement of the direct hearing device. In a refinement, advancement of the insertion device halts once the direct hearing device meets a certain threshold of resistance or if sound is perceived by the patient/user. This threshold is achieved by torque motor system 168 that cams over when a predetermined resistance is achieved. In a refinement, a grasping section 170 includes locking elements 172 that lock to inner actuator element 12 or outer component 20 when activated by the user. In this regard, insertion device 160 includes user-activated switch 174 and control circuitry 176. In a refinement, the tip of the inner actuator element can be disengaged from and re-engaged with the tympanic membrane without removal of the device from the ear canal.

In yet another variation, the direct hearing device 10 is secured in the ear canal using a passive system. In another variation, direct hearing device 10 is secured in the ear canal using an active system that allows the direct hearing device to be engaged or disengaged from the ear canal.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments, variations, and refinements can be combined to form further embodiments, variations, and refinements of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A direct hearing device comprising:

an inner actuator element that interacts with a subject's tympanic membrane, the inner actuator element positionable to sit in a subject's ear canal; and an outer component that includes a microphone, signal processing circuitry that processes a signal from the microphone, and a battery, the outer component in communication with the inner actuator element, wherein the outer component is removable and separatable from the inner actuator element, wherein the inner actuator element includes a mechanical transducer that moves a tip assembly response to an output signal from the signal processing circuitry and wherein the mechanical transducer includes an electromagnet, a first flexure, a second flexure, and at least one magnet positioned between the first flexure and the second flexure, the electromagnet being in electrical communication with the signal processing circuitry such that the at least on one magnet is moves responsively to the output signal from the signal processing circuitry with motion of the at least one magnet being transferred to a tip assembly.

2. The direct hearing device of claim 1, wherein the mechanical transducer includes a voice coil.

3. The direct hearing device of claim 1, wherein the outer component sits laterally to the inner actuator element in the subject's ear canal.

4. The direct hearing device of claim 1, wherein the outer component is placed exterior to the subject's ear canal with a tube connector connecting the outer component to the inner actuator element.

5. The direct hearing device of claim 1, wherein energy is transferred from the outer component to the inner actuator element via a radiofrequency stimulation.

6. The direct hearing device of claim 1, wherein energy is transferred from the outer component to the inner actuator element via a light-based transmission and translation into mechanical motion.

7. The direct hearing device of claim 1, wherein the outer component can lock in and connect to the inner actuator element using at least one electromagnet.

8. The direct hearing device of claim 7, wherein electromagnetic coupling can be activated and deactivated by a user or caregiver or medical provider such that the at least one electromagnetic or other coupling that can be disengaged and allow separation of the outer component of the direct hearing device.

9. The direct hearing device of claim 1, wherein the inner actuator element includes an actuator tip contacts a subject's malleus.

10. The direct hearing device of claim 1, wherein the inner actuator element includes an actuator tip and a shaft with a flexible joint between the actuator tip and the shaft, thereby allowing the actuator tip to conform to the subject's tympanic membrane.

11. The direct hearing device of claim 10, wherein the actuator tip comes in a kit configured to provide various angles between the shaft of the inner actuator element and the subject's tympanic membrane allowing it to be fitted to multiple patients.

12. The direct hearing device of claim 1 configured to allow placement of the direct hearing device in a subject while playing sound, wherein once the direct hearing device contacts the subject's tympanic membrane, a patient perceives sound and indicate proper placement of the direct hearing device.

13. An insertion device for the direct hearing device of claim 1, the insertion device configured to slowly advance the direct hearing device into the subject's ear canal while sound is played from the direct hearing device wherein once the direct hearing device is in contact with the subject's tympanic membrane and sound is generated, a user or medical provider can stop advancement of the direct hearing device.

14. The insertion device of claim 13 where advancement of the insertion device halts once the direct hearing device meets a certain threshold of resistance or if sound is perceived by a patient or user.

15. The direct hearing device claim 1, wherein a tip of the inner actuator element can be disengaged from and re-engaged with the subject's tympanic membrane without removal of the direct hearing device from the subject's ear canal.

16. The direct hearing device claim 1, wherein the direct hearing device is secured in the subject's ear canal using a passive or active system, the active system allowing the direct hearing device to be engaged and disengaged from the subject's ear canal.

17. The direct hearing device claim 1, wherein the outer component includes an oil reservoir configured to place oil in the subject's ear canal or on a patient's eardrum using a passive or active system.

18. The direct hearing device claim 1, wherein a refillable or non-refillable oil reservoir is placed in the subject's ear canal.

19. The direct hearing device of claim 1, wherein energy is transferred from the outer component to the inner actuator element via aligned coils.

20. The direct hearing device of claim 1, wherein the battery can be charged wirelessly while the direct hearing device is in place in the subject's ear canal or behind a subject's ear.

21. The direct hearing device of claim 1, wherein energy is transferred from the outer component to the inner actuator element via a piezoelectric system.

22. A direct hearing device comprising:

an inner actuator element that interacts with a subject's tympanic membrane, the inner actuator element positionable to sit in a subject's ear canal; and an outer component that includes a microphone, signal processing circuitry that processes a signal from the microphone, and a battery, the outer component in communication with the inner actuator element, wherein the outer component is removable and separatable from the inner actuator element and wherein the outer component can lock in and connect to the inner actuator element using at least one electromagnet.

23. The direct hearing device of claim 22, wherein electromagnetic coupling can be activated and deactivated by a user or caregiver or medical provider such that the at least one electromagnetic or other coupling that can be disengaged and allow separation of the outer component of the direct hearing device.

24. A direct hearing device comprising:

an inner actuator element that interacts with a subject's tympanic membrane, the inner actuator element positionable to sit in a subject's ear canal; and an outer component that includes a microphone, signal processing circuitry that processes a signal from the microphone, and a battery, the outer component in communication with the inner actuator element, wherein the outer component is removable and separatable from the inner actuator element, wherein the inner actuator element includes an actuator tip and a shaft with a flexible joint between the actuator tip and the shaft, thereby allowing the actuator tip to conform to the subject's tympanic membrane.

25. The direct hearing device of claim 24, wherein the actuator tip comes in a kit configured to provide various angles between the shaft of the inner actuator element and the subject's tympanic membrane allowing it to be fitted to multiple patients.

* * * * *